June 6, 1939.   E. E. RICHARDSON   2,160,907
FILTER FOR ULTRAVIOLET LIGHT
Filed March 31, 1936

INVENTOR.
Earle E. Richardson
BY
ATTORNEYS

Patented June 6, 1939

2,160,907

UNITED STATES PATENT OFFICE 2,160,907

FILTER FOR ULTRA-VIOLET LIGHT

Earle E. Richardson, Rochester, N. Y., assignor, by mesne assignments, to Eastman Kodak Company, Jersey City, N. J., a corporation of New Jersey Application March 31, 1936, Serial No. 71,907

7 Claims. (Cl. 95—2)

This invention relates to filters for ultra-violet light and particularly to such filters for use with photographic sensitive material.

In the exposure of sensitive photographic material, it is frequently desirable to prevent the action of ultra-violet light on the sensitive material. Photographic silver-halide emulsions are sensitive to the blue, violet and ultra-violet regions of the spectrum and the action of the ultra-violet region is frequently undesirable. This is especially true in the case of photographic material designed for use in color photography, in which the action of rays of the visible spectrum only is desired.

It is, therefore, an object of the present invention to provide filters for photographic material which absorb ultra-violet light of a definite wave length range.

This object is accomplished by incorporating in gelatin or other colloidal material a cyanine dye of the class of oxacyanines, benzoxacyanines and thiazolocyanines.

Figure 1:
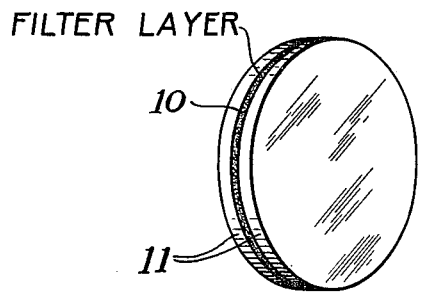
Figure 2:
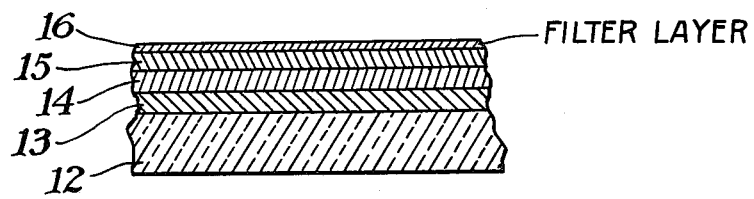

In the accompanying drawing, Figure 1 is a view in elevation of a light filter composed of a filtering layer of gelatin incorporated between glass plates, and Figure 2 is a view in section of a multilayer photographic film having a filter layer overcoating.

The dyes which I use for incorporation in filters according to my invention are certain cyanine dyes of the oxacyanine, benzoxacyanine and thiazolocyanine classes. Among these dyes are 2:2′-dialkyloxacyanine halides and 2:2′-dialkyl dibenzoxacyanine halides. These dyes and a method for preparing them are described in British Patent No. 419,361. Particular compounds of this class which I have found suitable are 2:2′-dimethyloxacyanine iodide and its homologues, such as 2:2′-diethyloxacyanine iodide and other alkyl derivatives, such as the dipropyl, methyl-ethyl, methyl-propyl and other derivatives. Other halides, such as chlorides and bromides may also be used. Among the dibenzoxacyanine dyes are 2:2′-dimethyl-3:4-3′:4′-dibenzoxacyanine iodide, 2:2′-diethyl-3:4-3′:4′-dibenzoxacyanine iodide, 2:2′-dimethyl-5:6-5′:6′-dibenzoxacyanine iodide and other alkyl derivatives, and halide salts. These compounds consist of two cyanine nuclei linked by a single methenyl group. The formula for 2:2′diethyloxacyanine iodide may be represented as follows:

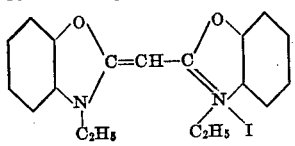

Another group of compounds which I have found suitable are the thiazolocyanine salts, such as 3:3′-diethylthiazolocyanine iodide, 3:3′-dimethyl-thiazolocyanine iodide and other alkyl derivatives and halide salts. These compounds consist of two thiazole nuclei linked by a single methenyl chain; the formula for 3:3′-diethylthiazolocyanine iodide may be represented as follows:

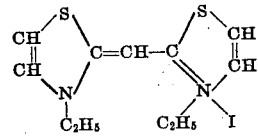

The thiazolocyanines may be prepared by treating an alkyl iodide of 2-methylthiazole or of a substituted 2-methylthiazole, with a nitrite, such as amyl nitrite, and an acid anhydride, such as acetic anhydride. For example, 3:3′-diethylthiazolocyanine iodide may be prepared by stirring 5 parts of 2-methylthiazole ethoidide into 34 parts of boiling acetic anhydride, and adding 2 parts of freshly prepared amyl nitrite. A brown solution results, from which a solid crystallizes in cooling. This solid is filtered off, washed with ether, ground with water, and extracted with ether in a Soxhlet apparatus. The undissolved residue is suspended in 35 parts of absolute alcohol and cooled with ice while sulfur dioxide is passed into it. More alcohol (140 parts) is then added, and the mixture boiled. The solid material is found to be dissolved and after filtering and cooling, yellow crystals separate, which are found to be analytically pure material.

This method of preparing the thiazolocyanine iodides is not a part of the present invention, but is the invention of Frances M. Hamer, and is described and claimed in a separate application, Serial No. 199,220, filed March 31, 1938.

The light absorption range of these compounds varies to some extent with the compound used, but in general the 2:2′-dialkyl-oxacyanine halides absorb the near ultra-violet light of wave lengths shorter than 400 millimicrons, while the dibenzoxacyanines and thiazolocyanines referred to absorb ultra-violet light and light in the near visible region up to about 480 millimicrons.

In making a light filter according to my invention, a suitable amount of one or more of the cyanine dyes described above is incorporated in a suitable colloidal material, such as gelatin, agar, cellulose esters, or ethers or synthetic resins. These resins include the polyvinyl esters, such as polymerized vinyl acetate which is known, for example, under the trade name "Gelva", the preparation of which is described in the U. S. Patents Nos. 1,241,738, 1,586,803 and 1,710,825. A further type of resin which may be used is the polyvinyl acetal type. These resins are condensation products of partially or completely hydrolyzed polyvinyl acetate and an aldehyde, such as formaldehyde, acetaldehyde, or butyraldehyde, and are known as polyvinyl acetals. They are sold under various trade names, such as "Formvar" and "Alvar". A still further type of resin which I may use is the alkyd type, which is a condensation product of a polybasic acid and a polyhydroxy alcohol. An example of this type of resin is "Glyptal", which is a condensation product of glycerine and phthalic acid or phthalic anhydride.

The following specific example illustrates one method of forming a filtering material according to my invention:

A stock solution of 2:2'-diethyl oxacynine iodide was prepared by dissolving one gram in 100 cc. of solvent (methyl alcohol). Three cc. of this stock solution were added to 24 cc. of a 15 per cent (by weight) solution of gelatin dissolved in water. These were thoroughly mixed into a homogeneous solution. Ten cc. of this gelatin dye mixture were coated at a temperature of approximately 40° C. to 45° C. on glass, the area being 100 sq. cm. After the coating had dried it was stripped from the glass surface.

I will now describe my invention with particular reference to the accompanying drawing. In Figure 1 of the drawing, I have shown a light filter made according to my invention in which 10 represents a layer of gelatin containing the filtering dye and 11 represents sheets of glass between which the gelatin filtering layer is incorporated. The layers 11 may, of course, be composed of any suitable transparent material, such as a cellulose ester or other material which is rigid enough to support the filtering layer 10.

In Figure 2, I have shown a multilayer photographic film in which the support layer 12 has coated on it three emulsion layers, 13, 14 and 15, which may be sensitized respectively to the red, green and blue regions of the spectrum. This film element has coated on it a filter layer 16 of gelatin or other material containing one or more of the cyanine dyes used according to my invention. In this type of film the three emulsion layers, 13, 14 and 15, in addition to being sensitive to particular regions of the visible spectrum are also sensitive to the violet and ultraviolet region and, for this reason, it is often desirable to exclude the ultra-violet light which exerts a deleterious effect on the emulsion layers.

In addition to their use as a light-filtering material in an inert gelatin layer, the dyes may also be incorporated in a sensitive emulsion layer or may be incorporated in a gelatin layer between two of the light sensitive layers, or may be incorporated in a backing layer coated on the rear side of the film. Other uses will also suggest themselves to those skilled in the art.

It is to be understood that my invention may be used in other ways not herein specifically mentioned and that I am to be limited only by the scope of the appended claims.

What I claim is:

1. A multi-layer photographic film comprising a transparent support, a plurality of emulsion layers, thereon, and over one of said emulsion layers, a layer of gelatin containing a cyanine dye selected from the group consisting of 2:2'-dialkyl oxacyanine halides, 2:2'-dialkyl dibenzoxacyanine halides, and 3:3'-dialkyl thiazolocyanine halides.

2. A multi-layer photographic film comprising a transparent support, a plurality of emulsion layers thereon, and over one of said emulsion layers, a layer of gelatin containing a 2:2'-dialkyl oxacyanine halide.

3. A multi-layer photographic film comprising a transparent support, a plurality of emulsion layers thereon, and over one of said emulsion layers, a layer of gelatin containing 2:2'-diethyl oxacyanine iodide.

4. A multi-layer photographic film comprising a transparent support, a plurality of emulsion layers thereon, and over one of said emulsion layers, a layer of gelatin containing a 2:2'-dialkyl dibenzoxacyanine halide.

5. A multi-layer photographic film comprising a transparent support, a plurality of emulsion layers thereon, and over one of said emulsion layers, a layer of gelatin containing 2:2'-diethyl dibenzoxacyanine iodide.

6. A multi-layer photographic film comprising a transparent support, a plurality of emulsion layers thereon, and over one of said emulsion layers, a layer of gelatin containing a 3:3'-dialkyl thiazolocyanine halide.

7. A multi-layer photographic film comprising a transparent support, a plurality of emulsion layers thereon, and over one of said emulsion layers, a layer of gelatin containing 3:3'-diethyl thiazolocyanine iodide.

EARLE E. RICHARDSON.